US012790663B2

(12) United States Patent
Rasool et al.

(10) Patent No.: US 12,790,663 B2
(45) Date of Patent: Nov. 10, 2026

(54) ORTHOSILICATE-BASED ADSORBENT AND SELECTIVE METAL ADSORPTION FROM BRINES USING ORTHOSILICATE-BASED ADSORBENT

(71) Applicant: CONDUCTIVE ENERGY INC., Calgary (CA)

(72) Inventors: Majid Rasool, Calgary (CA); Haafiz Hasham, Calgary (CA); Michael Daniel Mislan, Calgary (CA)

(73) Assignee: EMPOWER INNOVATION & TECHNOLOGY LLC, Addison, TX (US)

(*) Notice: Subject to any disclaimer, the term of this patent is extended or adjusted under 35 U.S.C. 154(b) by 1046 days.

(21) Appl. No.: 17/866,100

(22) Filed: Jul. 15, 2022

(65) Prior Publication Data

US 2023/0027987 A1 Jan. 26, 2023

Related U.S. Application Data

(60) Provisional application No. 63/222,273, filed on Jul. 15, 2021.

(51) Int. Cl.

| | |
|---|---|
| ***C22B 26/12*** | (2006.01) |
| ***B01J 20/04*** | (2006.01) |
| ***B01J 20/10*** | (2006.01) |
| ***B01J 20/30*** | (2006.01) |
| ***C01B 33/32*** | (2006.01) |
| ***C22B 3/24*** | (2006.01) |

(52) U.S. Cl.

CPC ............... *C22B 26/12* (2013.01); *B01J 20/04* (2013.01); *B01J 20/10* (2013.01); *B01J 20/3021* (2013.01); *B01J 20/3078* (2013.01); *B01J 20/3085* (2013.01); *C01B 33/325* (2013.01); *C22B 3/24* (2013.01)

(58) Field of Classification Search

CPC ........... B01D 15/08; B01J 20/10; B01J 20/04; C01B 33/325; C22B 3/24; C22B 26/12

See application file for complete search history.

(56) References Cited

U.S. PATENT DOCUMENTS

| | | | |
|---|---|---|---|
| 7,943,113 | B2 | 5/2011 | Chung |
| 9,988,280 | B2 | 6/2018 | Donaldson |
| 10,439,200 | B2 | 10/2019 | Snydacker |
| 10,626,020 | B2 | 4/2020 | Reed |
| 10,648,090 | B2 | 5/2020 | Snydacker |
| 2014/0087071 | A1 | 3/2014 | Chung |
| 2017/0217796 | A1 | 8/2017 | Snydacker |
| 2017/0298475 | A1 | 10/2017 | Paranthaman |

(Continued)

FOREIGN PATENT DOCUMENTS

| | | | |
|---|---|---|---|
| CA | 2271354 | A1 | 11/2000 |
| CA | 2661453 | A1 | 2/2008 |

(Continued)

OTHER PUBLICATIONS

European Search Report for Application No. 22185190 dated Nov. 29, 2022, 36 pages.

(Continued)

*Primary Examiner* — Melvin C. Mayes

(74) *Attorney, Agent, or Firm* — Meister Seelig & Schuster PLLC

(57) ABSTRACT

A process for recovery of lithium ions from a lithium-bearing brine, the process comprising: contacting the lithium-bearing brine with a lithium ion adsorbent based on orthosilicate. The lithium ion adsorbent is a de-lithiated form of: $Li_2X_{1-y-z}Y_yZ_zSiO_4$, where y and z together=0 to 1 and X, Y and Z are each Fe, Mg, Ca, Ni, Mn, Co, Zn, Cu, Ti, V, Sr or Zr.

2 Claims, 2 Drawing Sheets

(56) References Cited

U.S. PATENT DOCUMENTS

| | | | |
|---|---|---|---|
| 2019/0276327 | A1 | 9/2019 | Brown |
| 2020/0024686 | A1 | 1/2020 | Reed |

FOREIGN PATENT DOCUMENTS

| | | | |
|---|---|---|---|
| CN | 106390912 | A | 2/2017 |
| CN | 108187608 | A | 6/2018 |
| CN | 109173976 | A1 | 1/2019 |
| EP | 1569289 | A2 | 8/2005 |
| EP | 1569289 | A3 | 8/2005 |

OTHER PUBLICATIONS

Politaev et al: "Crystal structure, phase relations and electrochemical properties of monoclinic Li "2MnSio "4", Journal Of Solid State Chemistry, Orlando, FL, US, vol. 180, No. 3, Mar. 17, 2007, pp. 1045-1050, XP005927193, ISSN: 0022-4596, DOI: 10.1016/J.JSSC.2007.01.001 *the whole document*, 6 pages.

Ryu Taegong et al: "Mechanochemical Synthesis Of Silica-Lithium Manganese Oxide Composite For The Efficient Recovery Of Lithium Ions From Seawater", Solid State Ionics, North Holland Pub. Company. Amsterdam; NL, NL, vol. 308, Jun. 14, 2017 (Jun. 14, 2017), 77-83, XP085182194, ISSN: 0167-2738, DOI: 10.1016/J.SSI.2017.05.020 *the whole document*, 7 pages.

Shenouda A Y et al: "Synthesis, Characterization And Electrochemical Performance of$$\hbox {Li} {2}\hbox {Ni}_{x}\hbox {Fe}_{1-x}\hbox {SiO}_{4}$$Li2NixFe1-xSi04 Cathode Materials For Lithium Ion Batteries", Bulletin Of Materials Science, Indian Academy Of Sciences, Bangalore, vol. 40, No. 6, Sep. 6, 2017 (Sep. 6, 2017), pp. 1055-1060, XP036339406, ISSN: 0250-4707, DOI: 10.1007/S12034-017-1449-2 [retrieved on Sep. 6, 2017] *the whole document*, 6 pages.

ORTHOSILICATE-BASED ADSORBENT AND SELECTIVE METAL ADSORPTION FROM BRINES USING ORTHOSILICATE-BASED ADSORBENT

FIELD OF THE INVENTION

The present invention generally relates to the ion adsorbents and methods for recovering ions from brine, and more particularly, to the adsorption of metals, specifically lithium ions from brines.

DESCRIPTION OF PRIOR ART

Conventionally, it is well known that lithium is obtained from two main sources: solid lithium ores and liquid lithium resources, such as salt lake brines, underground brines, and seawater. Notably, more than 60% of the total lithium reserves (about 26.9 Mt) exist in brine.

Generally, lithium is produced from a brine resource by a traditional recovery method named the lime-soda method (or evaporation process) from brines in the form of $Li_2CO_3$, which can be further processed to obtain $LiOH \cdot H_2O$ as well. Roughly 120.5 ktonnes per year lithium is obtained by this process. This is typically a year or even longer solar evaporation process to get lithium concentration up to 6,000-60,000 ppm. Consequently, this process is also highly dependent on weather conditions. Furthermore, due to the addition of excess lime to remove magnesium, a large quantity of waste is produced as well. Therefore, this method is expensive, slow, inefficient, and non-eco-friendly.

Hence, more efficient, timesaving, and environmentally friendly methods for extracting lithium are needed. Therefore, in recent years, various new methods have emerged to extract lithium, such as electrodialysis, nanofiltration, ion-sieve adsorption, and ion-exchange-based extraction, also known as the direct lithium extraction method. Among these various methods, the direct lithium extraction method based on adsorption and ion exchange has proved to be quite effective for the selective extraction of lithium ions in various brine sources. Moreover, it can significantly increase the productivity of lithium ions by minimal energy requirements and simple operations.

Lithium ions present in naturally occurring brines are only one of many ions present in the brine. Thus, to extract the lithium, it is crucial to extract lithium ions selectively to produce chemical or battery-grade lithium salts. For example, cations such as magnesium, sodium, calcium, zinc, strontium, boron, and potassium may be present with many counter anions such as chloride, bromide, sulfates, nitrates, borates, and the like. Many of these are present in significantly higher quantities than lithium. For example, a simple analysis (cations only) of oil field brine chemistries show calcium and sodium to be routinely present at 300 times and 1200 times, respectively, higher than the lithium concentration.

Each ion present in addition to lithium is considered an impurity for selective lithium removal/extraction purposes. For example, when lithium-based salts such as lithium carbonate or lithium hydroxide are used to prepare cathode materials for lithium ion batteries, relatively high sodium impurities present in cathodes can shorten the cycle-life of such batteries. Likewise, any other cation/anion impurities are least desirable for the production of battery-grade lithium salts i.e., lithium carbonate ($Li_2CO_3$) or lithium hydroxide ($LiOH \cdot H_2O$), the purity should be greater or equal to 99.5% by weight percent. Thus, an effective adsorbent/ion-exchange material should possess high selectivity for lithium ions and reject other ions (cations and anions) present in the brine.

Metal oxides, particularly, variants of manganese and titanium-based oxides such as lithium manganese oxides $Li_xMn_yO_z$ (LMO) and lithium titanium oxides $Li_xTi_yO_z$ (LTO), have been proposed for direct selective lithium extraction. In such an extraction, the metal oxides are contacted with the brine to adsorb lithium therefrom and then acid washed to recover the adsorbed lithium from the adsorbent. Although these commonly used oxides can extract up to 90-99% lithium ions from various brine sources with reasonable lithium uptake capacity, they suffer from several issues such as intense material dissolution during the acid washing step. This significantly reduces their cycle life and overall lithium ion uptake capacity and makes them unsuitable for their long-term usage at large industrial scale and current growing demands for providing sustainable methods to recover metals, in general.

Consequently, there remains a need for lithium adsorption materials.

SUMMARY

In accordance with a broad aspect of the present invention, there is provided a process for recovery of lithium ions from a lithium-bearing brine, the process comprising: contacting the lithium-bearing brine with a lithium ion adsorbent based on an orthosilicate.

In accordance with another broad aspect of the present invention, there is provided a method for manufacturing an orthosilicate lithium ion adsorbent comprising: calcining lithium, silicate and one or more metals to obtain a compound according to the formula $Li_2X_{1-y-z}Y_yZ_zSiO_4$, where y and z together=0 to 1 and X, Y and Z are each selected from Fe, Mg, Ca, Ni, Mn, Co, Zn, Cu, Ti, V, Sr or Zr; and de-lithiating the compound, to obtain the lithium ion adsorbent.

In accordance with another broad aspect of the present invention, there is provided a lithium ion adsorbent comprising: a solid particulate de-lithiated metal orthosilicate.

In accordance with another broad aspect of the present invention, there is provided a de-lithiated metal orthosilicate for use as a lithium ion adsorbent or a de-lithiated metal orthosilicate derived from $Li_2X_{1-y-z}Y_yZ_zSiO_4$, where y and z together=0 to 1 and X, Y and Z are each independently selected from Fe, Mg, Ca, Ni, Mn, Co, Zn, Cu, Ti, V, Sr and Zr, and used as a lithium ion adsorbent.

DETAILED DESCRIPTION OF THE INVENTION

Figure 1:
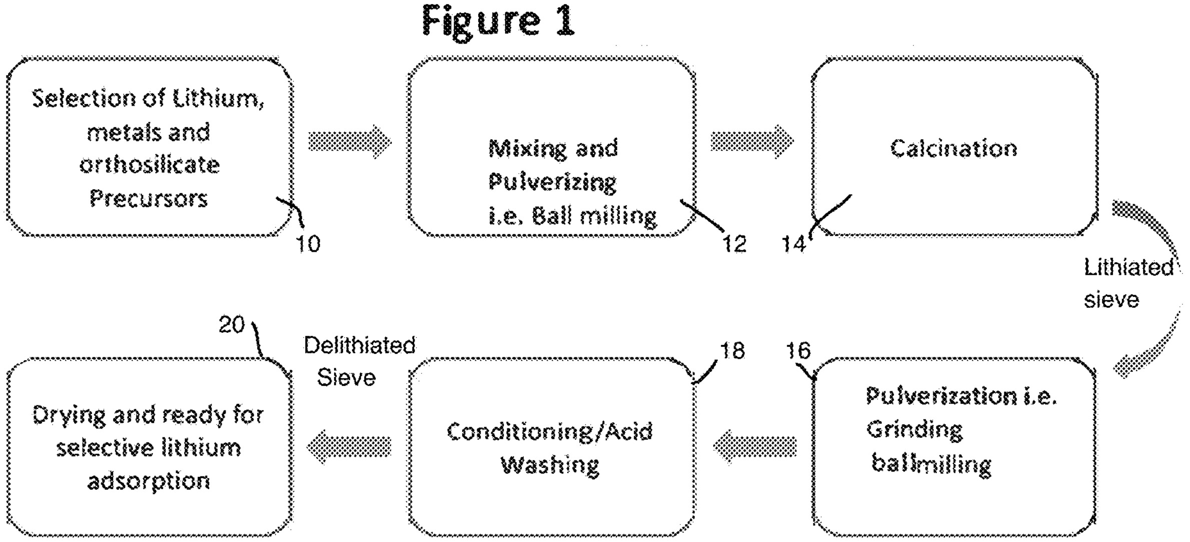
FIG. 1 is a flow diagram of the typical manufacturing procedure for a selective lithium adsorbent based on orthosilicates.

In one aspect, the invention is directed to an inorganic lithium adsorption material, specifically an orthosilicate used for selective lithium extraction from various brines sources, such as geothermal brines, and other aqueous solutions. Such orthosilicate-based lithium ion sieves described herein may advantageously exhibit a high or improved lithium adsorption capacity, lithium selectivity, and/or physical resiliency and may provide a cycle life better than oxide-based adsorbents.

The lithium ion adsorbent of the present invention is a de-lithiated metal orthosilicate-based on the formula:

$$\text{(de-Li}_2\text{) } X_{1\text{-}y\text{-}z}Y_yZ_zSiO_4,$$

where y and z together=0 to 1. Another way of defining the composition is that the total of X, Y and Z total 1 mole. Further, X, Y, and Z are each metals independently selected from iron, magnesium, calcium, nickel, manganese, copper, zinc, cobalt, titanium, vanadium, strontium, zirconium (metals: Fe, Mg, Ca, Ni, Mn, Cu, Zn, Co, Ti, V, Sr and Zr). Herein below, the state of being de-lithiated is sometimes indicated with the symbol "a".

Some suitable orthosilicate lithium ion adsorbents are de-lithiated forms of any of: $Li_2FeSiO_4$, $Li_2MgSiO_4$, $Li_2NiSiO_4$, $Li_2CoSiO_4$, $Li_2MnSiO_4$, $Li_2ZnSiO_4$, $Li_2CuSiO_4$, $Li_2TiSiO_4$, $Li_2VSiO_4$, $Li_2SrSiO_4$, $Li_2CaSiO_4$, $Li_2ZrSiO_4$, $Li_2TiMnSiO_4$, $Li_2MgTiCaSiO_4$, etc. Combinations of any of the foregoing are also useful as the adsorbent.

Orthosilicates that include titanium have been found to act very well as a lithium sieve even in complex brines. For example, an orthosilicate where one of the metals X, Y or Z is titanium may be useful. An orthosilicate sieve that is based on titanium, where titanium is at least 50% mol of the metal content have performed well in lithium uptake, selectivity and ruggedness (i.e. resistance to break down by acid treatment/de-lithiation).

Magnesium-based sieves are those where the metal content is at least 50% mol Mg. That is where Mg is the only metal which may contain 20-50% dopants of other metals selected from the group consisting of Fe, Ca, Ni, Mn, Cu, Zn, Co, Ti, V, Sr and Zr. Magnesium-based sieves work well for brine treatments with respect to lithium uptake and selectivity.

In some embodiments, the orthosilicate contains calcium. Calcium doping has been found to provide an orthosilicate sieve with a stable crystal structure, and possibly enhanced kinetics and lithium selectivity.

The adsorbent can be manufactured from a lithiated metal orthosilicate according to the general formula:

$$Li_2X_{1\text{-}y\text{-}z}Y_yZ_zSiO_4$$

where y and z together=0-1; and X, Y and Z each are a metal selected from the group consisting of Fe, Mg, Ca, Ni, Mn, Co, Zn, Cu, Ti, V, Sr and Zr. The metals may be present alone or in various combinations. The compound is treated to remove the lithium ions. This results in an adsorbent with a crystal structure chemically configured to selectively adsorb/retain lithium ions.

To produce the orthosilicate, one or more of the metals listed above, silicate and lithium precursors are calcined to prepare a particulate. The particulate has a crystal structure incorporating the lithium. Subsequently, the particulate is washed to remove most if not all the lithium from the crystal structure. This process creates a de-lithiated particulate material, which is the orthosilicate sieve that is ready to be used to extract lithium from aqueous resources, such as various brines.

FIG. 1 illustrates schematically a method to prepare the orthosilicant-based selective lithium adsorbent. In one embodiment, for example, precursors of one or more of the metals listed above, silicate and lithium are selected 10 and mixed 12. Ball milling 12 can be used to both mix and break down the solid precursors. The precursors can be a finely distributed and well mixed. The starting material of silicate, lithium and one or more of the metals listed above is then calcinated 14. In particular, the mixture is heated to temperatures in excess of 200° C., such as 200-1200° C., to obtain the lithiated metal orthosilicate. The calcination process may include a multi-step heating and a multi-step cooling process, where the mixture of solids is heated in a first stage to a first temperature and held at that temperature for a period of time and then further heated to a second, higher temperature and held at that second temperature for a period of time, to obtain a calcined lithiated solid. Then cooling also may be by a stepped process. For example, the calcined lithiated solid is cooled in a first stage to a first cooled temperature and then the calcined lithiated solid is cooled in a second stage to room temperature.

This process of calcination results in a solid lithiated metal orthosilicate. This resulting solid is generally in the form of a particulate, such as a powder or granules. To improve its form, such as to select for size and increase surface area, the resulting solid lithiated metal orthosilicate, after calcining, may be milled 16 to create a consistent particulate, such as in powdered or granulated form. To facilitate handling, the particulate may have a particulate size of greater than 5 nm and less than lcm, for example 0.01 to 10 microns or 0.150 to 1 micron.

The lithiated material is then treated 18, such as by acid washing, to remove the lithium from the metal orthosilicate crystalline structure. Acid washing may employ a strong acid such as hydrochloric or sulphuric acid.

After drying 20, this results in a de-lithiated metal orthosilicate, which is useful as an adsorbent for lithium. The adsorbent has a surface (for example may have pores or an attractant surface), where the lithium was removed, that is selectively configured to adsorb lithium ions.

To describe possible aspects of the method in greater detail, a solid state synthesis method is used to obtain orthosilicate-based sieve. The solid state synthesis method of the present invention offers a commercially viable route to produce an orthosilicate-based lithium ion sieve. Generally, solid-state synthesis is commonly used to cause a chemical reaction from solid starting materials to form a new solid with a well-defined structure. Typically, a solid-state synthesis includes mixing solid chemical reagents and then calcination at high temperature and/or pressure. Materials are pre-mixed, sometimes pelletized, and finely pulverized, followed by high-temperature solid-state reactions at a controlled temperature for a specific time. Some metal compounds, such as metal oxides or salts, require extreme conditions, such as high temperatures and pressure, to initiate reactions in a molten flux or a rapidly condensing vapor phase. Nevertheless, solid phase synthesis methods can have the disadvantage of non-uniform surface area distribution and heterogeneous particle size distribution. To solve the problems of the solid phase synthesis method, the present inventions describe a modified solid-state synthesis method for producing a lithium sieve material based on orthosilicates. The present manufacturing process may include mixing and particle size reduction of the chemical reagents by using ball milling and a particular ramp up/down of the calcination heating and cooling protocol. Therefore, the present manufacturing process is useful for manufacturing orthosilicate sieves at a commercial production scale.

In one possible embodiment, an orthosilicate, lithium ion sieve for selective lithium adsorption is prepared. The starting materials may be mixed in a stoichiometric ratio of Li:Metals:$SiO_4$=2 mol:1 mol:1 mol. Li can be obtained from various lithium precursors such as lithium carbonate, lithium nitrate, lithium sulfate, lithium hydroxide, and lithium chloride, etc. Similarly, Metals denote the one or more metal precursors, which can be selected from the group consisting of Fe, Mg, Ca, Ni, Mn, Co, Zn, Cu, Ti, V, Sr and Zr, possibly in oxide form. Silicate ($SiO_4$) can be sourced from fumed silica, tetramethyl orthosilicate and/or tetraethoxysilane etc. The first step is to mix the chemical reagents. The mixing process may also pulverize the reagents using a mechano-chemical process, such as may be achieved with a ball-milling machine. Mechano-chemical processing is a technique for mixing and pulverizing solids in which mechanical and chemical phenomena are coupled on a molecular scale. The friction between the material's particle surface and balls has the effect of reducing the particle size and therefore increasing the overall surface area available for reaction. By reducing the particle size, the adsorption kinetics are improved.

In one embodiment, the method combines sources of silicate, lithium, and metal in a ball-milling machine. It has been found that ball milling with balls of two or more sizes ranging from 2 mm to 20 mm provides a good particle size within the range and well-mixed precursors.

After mixing and pulverizing 12, the mixture of precursors is calcined 14. In one possible aspect, a first heat treatment of the mixed/pulverized material is performed between 200° C. to 350° C., for example at 290 to 310° C. or about 300° C. for 1 to 3 hours, for example from 1 hour 45 minutes to 2 hours 15 minutes or about 2 hours. This first step may be followed by a second heat treatment between 350° C. to 850° C., where for example the temperature is raised to and maintained above 650° C. or possibly above 700° C. for at least 7 and possibly at least 8 hours.

Then, the material is cooled. In one possible aspect, the material is cooled down in two steps: for example the calcined material is cooled from the highest temperature to a first cooled temperature of about 400 to 500° C., which is maintained over a first period of time, which is two to four hours, and then the calcined material is cooled from the first cooled temperature to room temperature in a shorter period of time than the first period of time. The second period of time is shorter than the first period of time, and may be for example, one to three hours. In one embodiment for example, the calcined material is cooled from its hottest temperature, for example at least 700° C., to 440 to 460° C., or about 450° C., in 2.5 to 3.5, for example, about 3 hours. Then, the material is further cooled to room temperature, for example to 25° C., in 1.5 to 2.5 hours, for example, about 2 hours. Stepwise heating and cooling treatments may help to induce a useful crystal orientation during the nucleation/crystallization process of solid-state synthesis. All the heat/cooling treatments may be performed under ambient conditions. This process of calcination results in a solid lithiated metal orthosilicate. This resulting solid is generally in the form of a particulate, such as a powder or granules. To improve its form, such as to select for size and increase surface area, the resulting solid lithiated metal orthosilicate, after calcining and cooling, may be milled to create a consistent particulate, such as in powdered or granulated form. To facilitate handling, the particulate may have a particulate size of greater than 5 nm and less than lcm, for example, 0.01 to 10 microns or 0.150 to 1 micron.

The lithiated orthosilicate lithium selective sieve material is then treated, such as by acid washing, to remove the lithium from the crystal structure of the metal orthosilicate. Acid washing may employ a strong acid such as hydrochloric or sulphuric acid. For example, For example, the concentration of the acid should not be less than 0.1 M, for example at concentrations greater than 0.2M and less than 5M. The lithiated material may be mixed with the acid solution for at least one day and possibly 1.5 to 3 days. Once a stable acidic pH is achieved, for example by soaking in an acid solution and monitoring pH for at least 12 hours, the material can be removed from the acid and dried 20. Drying may be a combination of any various techniques such as vacuum suction, air and/or oven drying. This results in a de-lithiated metal orthosilicate, which is useful as an adsorbent for lithium. The adsorbent has pores, where the lithium was removed, that are selectively configured to adsorb lithium ions.

In the adsorbent, the metals reside in octahedral or tetrahedral sites in the crystal structure. As noted, the metals are selected among iron, magnesium, nickel, calcium, manganese, copper, zinc, cobalt, titanium, vanadium, strontium, and zirconium. In one embodiment, the adsorbent includes iron alone or with nickel, titanium and/or manganese or titanium alone or with manganese, magnesium and/or calcium. Orthosilicate sieves may be improved in terms of lithium selectivity and extended material cycle life by calcium doping The adsorbent can be employed directly in the as-synthesized, de-lithiated, particulate (i.e. powdered or granulated) form. In other embodiments, the adsorbent is formed into, applied to substrates, to result in beads, fibres, membranes, etc. Substrates are selected to be substantially resistant to degradation by concentrated brines and acid. The sieve is not intended for a current carrier application so the substrates and forms need not be current carrying, for example, can be non-electrically conductive. Conductive materials such as carbons, copper and aluminum need not be used.

The de-lithiated metal orthosilicate can be employed to adsorb and thereby recover lithium from a brine. In one embodiment of the present invention, solid, particulate de-lithiated metal orthosilicate lithium ion adsorbent media is distributed in and contacted with a lithium-containing feed brine, for example, in a stirred tank reactor. For instance, the reactor can be a tank with an agitator. The tank can contain the liquid to be treated along with the lithium ion adsorbent. The orthosilicate lithium ion adsorbent may be maintained in suspension by an agitator/mixer, which provides superior kinetics and the high contact area between the lithium ion adsorbent and the brine. The pH of the brine in the reactor can be maintained at a desired level through additions of a base, such as sodium hydroxide, ammonium hydroxide, potassium hydroxide, sodium carbonate, magnesium hydroxide, and calcium hydroxide. For example, the pH of the brine in the reactor may be maintained at greater than 6.0 and less than 10. The reaction time between lithium ion adsorbent and feed brine can be between 1 sec and 60 min until nearly all of lithium ions are sorbed to the orthosilicate lithium ion adsorbent.

After the reaction time between the feed brine and the adsorbent, the adsorbent may be separated from the remaining liquid, for example, using gravity or suction systems. To facilitate separation, the adsorbent may be selected to have particles greater than 1-5 nm in diameter.

To maximize the purity of the recovered lithium ion, care should be taken to separate as much as possible of the feed brine from the loaded lithium ion adsorbent. Any residual feed brine retained with the loaded orthosilicate lithium ion adsorbent contaminates the product with impurities in the feed brine, such as boron, strontium, barium, and more commonly calcium, magnesium, sodium, potassium, etc. As the concentration of these impurities in the brine is much higher than the lithium, even minimal amounts of brine carry-over can be quite troublesome to remove. For instance, the purity requirements for battery-grade lithium carbonate are quite rigorous and require about 99.5 weight % purity levels.

As such, the loaded adsorbent may be washed, for example, with water. This can be during the above-noted separation or as a subsequent step, followed by another solids separation from liquids, in this case the wash water. In addition, the wash water requirements can be reduced by recycling the spent water solution by purifying it by the reverse-osmosis process.

Subsequently, water washing of the loaded orthosilicate lithium ion adsorbent, acid can be used to recover lithium ions from the adsorbent. This is referenced herein as an elution process. Elution is analogous to the above-described acid washing step, but less time is required. The acid de-sorbs/decomplexes lithium ions sorbed to the orthosilicate adsorbent to provide a recovered lithium ion solution, which may be called eluate. In one embodiment, the acid is a strong acid such as hydrochloric acid or sulfuric acid. Acid concentration may be maintained at a substantially constant value through the addition of said acid. For example, the concentration of the acid should not be less than 0.1 M and preferably at concentration of greater than 0.2M and less than 5M. An average contact time of the acid with the orthosilicate lithium ion adsorbent may be less than 3 hours.

Recovered lithium ion solution after the acid wash can be further purified with a lime-soda ash process to precipitate any double valent cations. However, efficient washing of the loaded orthosilicate lithium ion adsorbent before passing it onto the acid recovery step minimizes the need for these extra processes.

The adsorbent has been found to remove more than 90% and usually more than 95% of lithium from various brines. Typical brines include oil fields, geothermal and continental brines and salt lake waters, etc.

The stripped adsorbent may be recycled for further lithium recovery. For example, the adsorbent after recovery of the lithium may be used directly for contact with further brine.

The present invention will hereinafter be described with reference to exemplary embodiments, which are written to be understood only as examples and are not intended to limit the scope of the present application.

EXAMPLES

Example I: De-Lithiation of a Lithiated Orthosilicate to Provide an Adsorbent 10.0 g of granulated lithiated titanium orthosilicate was added into a 2 L beaker. 1.5 litres of a 0.2 M HCl solution was added to the beaker containing the sieve. The mixture was constantly stirred on a hot plate or heated tank etc. and the temperature controller was set to 60° C. During the de-lithiation, the pH of the mixture was monitored and periodically adjusted by the addition of further concentrated HCl to remain under 1.5. This acid conditioning to achieve de-lithiation was carried out for 48 hours. Once this time had elapsed and a stable pH under 1.5 was achieved for 12 hours without acid addition, the de-lithiation was complete. The sieve was collected, filtered and partially dried under suction using vacuum filtration. Then, the partially dried sieve was transferred to a wash crucible. The wash crucible was then placed in an oven overnight for 12 hours with the oven set to approximately 80° C. Once fully dry, the orthosilicate-based sieve is fully conditioned and ready to adsorb lithium from various brine sources.

Example II: Preparation of Various Orthosilicate Sieves & Lithium Uptake Capacity Lithium titanate silicate (LTS) was prepared via solid-state synthesis. 37 g of lithium carbonate (Sigma Aldrich), 15 g of fumed silica (Millipore Sigma) and 20 grams of titanium dioxide (VWR) were weighed out. Then the reagents were pulverized and mixed in a ball-milling machine with steel balls until a well-dispersed powder was obtained. Then, the mixture was calcined in a furnace with the first ramp up from 24 to 400° C. for 3 hours and second ramp up from 400° C. to 750° C. for 8 hours. After the heat ramp up, the furnace controller was set to ramp down for 3 hours from 750° C. to 350° C., followed by a second ramp down from 350° C. to 25° C. in 2 hours. The solid mixture was then pulverized by ball milling until a well-dispersed powder was obtained. The powder was sieved to obtain a consistently sized particulate. Then, the orthosilicate was de-lithiated using 0.2M HCl for a duration of 60 hours. The de-lithiated sieve α-LTS was collected by vacuum filtration, rinsed with deionized water and dried at 60° C. for 12 hours.

Lithium titanate manganese silicate, specifically $Li_2Ti_{0.5}Mn_{0.5}SiO_4$ (herein referred to as LTMnS) was prepared via solid-state synthesis. 37 g of lithium carbonate (Sigma Aldrich), 15 g of fumed silica (Millipore Sigma) and 9.8 grams of titanium dioxide (VWR) and 10.7 grams of manganese dioxide (Sigma Aldrich) were weighed out. Then the reagents were pulverized and mixed in a ball-milling machine with steel balls until a well-dispersed powder was obtained. Then, the mixture was calcined in a furnace with the first ramp up from 24 to 400° C. for 4 hours and second ramp up from 400° C. to 850° C. for 8 hours. After the heat ramp up, the furnace controller was set to ramp down for 3 hours from 750° C. to 350° C., followed by a second ramp down from 350° C. to 25° C. in 2 hours. The solid mixture was then pulverized by ball milling until a well-dispersed powder was obtained. The powder was sieved to obtain a consistently sized particulate. Then, the orthosilicate was de-lithiated using 0.2M HCl for a duration of 60 hours. The de-lithiated sieve α-LTMnS was collected by vacuum filtration, rinsed with deionized water and dried at 60° C. for 12 hours.

A magnesium-based sieve doped with titanium and calcium, specifically $Li_2Mg_{0.5}Ti_{0.25}Ca_{0.25}SiO_4$ (herein referred to as LMgTCaS), was prepared via solid-state synthesis. 37 g of lithium carbonate (Sigma Aldrich), 15 g of fumed silica (Millipore Sigma), 14.7 grams of magnesium sulphate (Sigma Aldrich), and 4.8 grams of titanium dioxide (VWR) and 4.6 grams calcium hydroxide (VWR) were pulverized and mixed in a ball-milling machine. This was done with steel balls until a well-dispersed powder was obtained. Then, the mixture was calcined in a furnace with the first ramp up from 24 to 400° C. for 5 hours and second ramp up from 400° C. to 800° C. for 10 hours. After the heat ramp up, the furnace controller was set to ramp down for 3 hours from 750° C. to 350° C., followed by a second ramp down from 350° C. to 25° C. in 2 hours. The solid mixture was then pulverized by ball milling until a well-dispersed powder was obtained. The powder was sieved to obtain a consistently sized particulate. Then, the orthosilicate was de-lithiated using 0.2M HCl for a duration of 60 hours. The de-lithiated sieve α-LMgTCaS was collected by vacuum filtration, rinsed with deionized water and dried at 60° C. for 12 hours.

These de-lithiated orthosilicate sieves α-LTS, α-LTMnS and α-LMgTCaS were then each interacted with a synthetic lithium-bearing brine to assess its capacity for lithium uptake. This was accomplished by adding the sieve to a 2000 mg/L Li brine at pH 11 and 60° C. under continuous agitation for a duration of two hours. The ratio of sieve to brine was selected to be 50 mg lithium present per gram sieve. The pH was maintained above 10.5 for the duration of the adsorption to promote lithium uptake. Following adsorption, elution of lithium was performed in 0.2M HCl for 60 minutes to verify lithium recoverability and de-lithiation. The uptake capacities of α-LTS, α-LTMnS, and α-LMgTCaS are shown in Table 1. The conventional molecular sieve lithium titanium oxide (LTO) prepared under similar solid-state calcination conditions was tested for lithium uptake under the same conditions as well. The uptake capacity of LTO is also shown in Table 1.

TABLE 1

Lithium sieve uptake capacity from synthetic brine

| Sieve | Li uptake (mg/g) |
|---|---|
| LTS | 30.4 |
| LTMnS | 20.9 |
| LMgTCaS | 23.1 |
| LTO | 22.4 |

These results show that the orthosilicate sieves each have a remarkable affinity for lithium that is similar to or exceeds the current industry standard LTO. The affinity is comparable to that of the conventional titanate sieve LTO. Most notably in the case of LTS, a superior capacity of 30.4 mg/g was achieved. This capacity is near the theoretical maximum uptake of the sieve indicating the strong viability of orthosilicates as molecular sieves for lithium uptake. Additional batches of LTS were similarly prepared and the uptake was consistently better than that of the conventional LTO sieve. The LTO averaged only 23.7 mg/g Li uptake across four trials.

Example III: Interaction of Orthosilicate Sieves with Complex Brine

For battery-grade lithium, sieve-adsorbed impurities must be reduced as much as possible. In particular, it is normal for battery-grade lithium products to require 99.9% purity. It is common that brines mined for lithium are complex, containing significant concentrations of B, Ba, Ca, Na and Sr. Therefore, apart from high lithium update capacity, protection against acid, and high crystal integrity of sieves, a good sieve will not carry substantial amounts of impurities over into the final lithium-rich eluate.

Following lithium uptake capacity testing, the orthosilicate sieves α-LTS, α-LTMnS and α-LMgTCaS and the current industry standard LTO were each interacted with a complex brine of approximately 700 mg/L lithium for adsorption/elution process. This was achieved using a similar procedure as the capacity testing. The sieve to brine ratio was adjusted to maintain an excess of lithium present at approximately 45 mg per gram sieve. The pH of adsorption in complex brine was maintained in the range of 7.5-8.0 as one embodiment of the invention allows. These adsorption tests were conducted for a duration of four hours to observe total uptake kinetics over an extended period. After the adsorption cycle, the sieves were separated from the brine by vacuum filtration. Then the sieves were rinsed to remove loosely associated salts and then eluted with HCl as described above for one potential embodiment of the invention. The lithium uptakes from complex brine by LTS, LTMnS, LMgTCaS, and LTO are shown in Table 2.

TABLE 2

Lithium sieve uptake capacity from complex brine

| Sieve | Li uptake (mg/g) |
|---|---|
| LTS | 25.8 |
| LTMnS | 21.1 |
| LMgTCaS | 12.7 |
| LTO | 11.7 |

These results show excellent uptake by the orthosilicate sieves LTS and LTMnS in complex brine with minimal loss of capacity compared to synthetic brine at higher concentration and pH. This is especially noteworthy given the relatively poor performance of LTO under these conditions, which only adsorbed approximately half as much lithium as LTS and LTMnS.

The metals composition of the brine is shown in Table 3 along with the composition of the eluates obtained from each sieve. As would be expected, the complex brine had high concentrations of other cations such as barium, calcium, sodium, and strontium along with 696 ppm of lithium. After the adsorption/elution process, the eluate was obtained. The existence of other ions is typically considered as representative of selectivity of the adsorbent for these other competing ions in the lithium exchange. In general, the three embodiments tested here showed much greater selectivity for lithium, or conversely much lower selectivity for competing ions than the industry standard LTO. For example, calcium, a major and problematic contaminant in lithium recovery, was substantially lower from all three potential embodiments when compared to the industry standard LTS. The same exceptional performance was observed for barium and strontium, two more problematic contaminants in lithium recovery. It is apparent that the orthosilicate-based adsorbents embodied in this invention have exceptional performance when compared with the industry standard oxide-based sieves in regards to both lithium uptake and selective lithium extraction from complex brines.

TABLE 3

]Metals composition of complex test brine and resulting lithium-rich eluates from orthosilicates and LTO

| Metals | Complex brine | LTS eluate | LTMnS eluate | LMgTCaS eluate | LTO eluate |
|---|---|---|---|---|---|
| Al (mg/L) | ND | 7.1 | 14.8 | ND | 8.9 |
| B (mg/L) | 13.0 | 2.9 | 3.5 | 1.5 | 2.7 |
| Ba (mg/L) | 5531 | 60 | 114 | 28 | 166 |
| Ca (mg/L) | 67748 | 130 | 264 | 47 | 331 |
| Co (mg/L) | ND | ND | ND | ND | ND |
| Cr (mg/L) | ND | ND | ND | ND | ND |
| Cu (mg/L) | ND | ND | ND | ND | ND |
| Fe (mg/L) | ND | ND | ND | ND | ND |

TABLE 3-continued

| ]Metals composition of complex test brine and resulting lithium-rich eluates from orthosilicates and LTO | | | | | |
|---|---|---|---|---|---|
| Metals | Complex brine | LTS eluate | LTMnS eluate | LMgTCaS eluate | LTO eluate |
| K (mg/L) | 948.0 | ND | ND | ND | ND |
| Li (mg/L) | 696 | 517 | 690 | 184 | 196 |
| Mg (mg/L) | 637 | 297 | 252 | 81 | 15 |
| Mn (mg/L) | ND | 0.9 | 35.5 | 0.6 | 0.8 |
| Na (mg/L) | 46116 | 128 | 158 | 784 | 314 |
| Ni (mg/L) | ND | ND | ND | ND | ND |
| S (mg/L) | 23.7 | ND | ND | ND | ND |
| Si (mg/L) | 4.5 | 78.1 | 80.3 | 29.2 | 15.5 |
| Sr (mg/L) | 16695 | 24.0 | 66.3 | 11.3 | 68.0 |
| Ti (mg/L) | ND | 15.2 | 2.9 | 26.1 | 12.0 |
| V (mg/L) | ND | ND | ND | ND | ND |
| Zn (mg/L) | ND | ND | ND | ND | 1.1 |

The excellent selectivity of the orthosilicates LTS and LTMnS in Table 3 is further highlighted by the relative molar compositions of the eluates given in Table 4:

TABLE 4

| Relative % molar metals composition of complex test brine and resulting lithium-rich eluates from orthosilicates and LTO | | | | | |
|---|---|---|---|---|---|
| Metals | Complex brine | LTS eluate | LTMnS eluate | LMgTCaS eluate | LTO eluate |
| Al (mol %) | 0.0% | 0.3% | 0.4% | 0.0% | 0.6% |
| B (mol %) | 0.0% | 0.3% | 0.3% | 0.2% | 0.5% |
| Ba (mol %) | 1.0% | 0.4% | 0.6% | 0.3% | 2.2% |
| Ca (mol %) | 41.4% | 3.2% | 5.1% | 1.7% | 15.2% |
| Fe (mol %) | 0.0% | 0.0% | 0.0% | 0.0% | 0.0% |
| K (mol %) | 0.6% | 0.0% | 0.0% | 0.0% | 0.0% |
| Li (mol %) | 2.5% | 74.6% | 76.9% | 39.4% | 52.2% |
| Mg (mol %) | 0.6% | 12.2% | 8.0% | 5.0% | 1.1% |
| Mn (mol %) | 0.0% | 0.0% | 0.5% | 0.0% | 0.0% |
| Na (mol %) | 49.2% | 5.6% | 5.3% | 50.8% | 25.2% |
| S (mol %) | 0.0% | 0.0% | 0.0% | 0.0% | 0.0% |
| Si (mol %) | 0.0% | 2.8% | 2.2% | 1.6% | 1.0% |
| Sr (mol %) | 4.7% | 0.3% | 0.6% | 0.2% | 1.4% |
| Ti (mol %) | 0.0% | 0.3% | 0.1% | 0.8% | 0.5% |
| Zn (mol %) | 0.0% | 0.0% | 0.0% | 0.0% | 0.0% |

The relative enrichment of lithium observed in the LTS and LTMnS eluates is remarkable, with notable suppression of calcium, sodium, barium, and strontium relative to LTO. The major drawback of the orthosilicates is in carryover of magnesium. The relative molar abundance of lithium at 74.600 and 76.9% achieved with LTS and LTMnS demonstrates superior overall selectivity of these sieves compared to the 52.2% achieved with LTO.

LMgTCaS performed exceptionally well and only contained 1.5 mol 00 of calcium impurities. While there was 50% sodium impurity, Na can be removed from a lithium-rich eluate during a soda-ash reaction to obtain battery-grade lithium (lithium carbonate).

The orthosilicate sieves showed no signs of degradation under the mild alkaline conditions used for adsorption in complex brine, with the relative mass loss of dissolved silica measured post adsorption remaining under 0.1% for all trials.

Example IV: Acid Resilience Test of Orthosilicate Sieves

Figure 2:
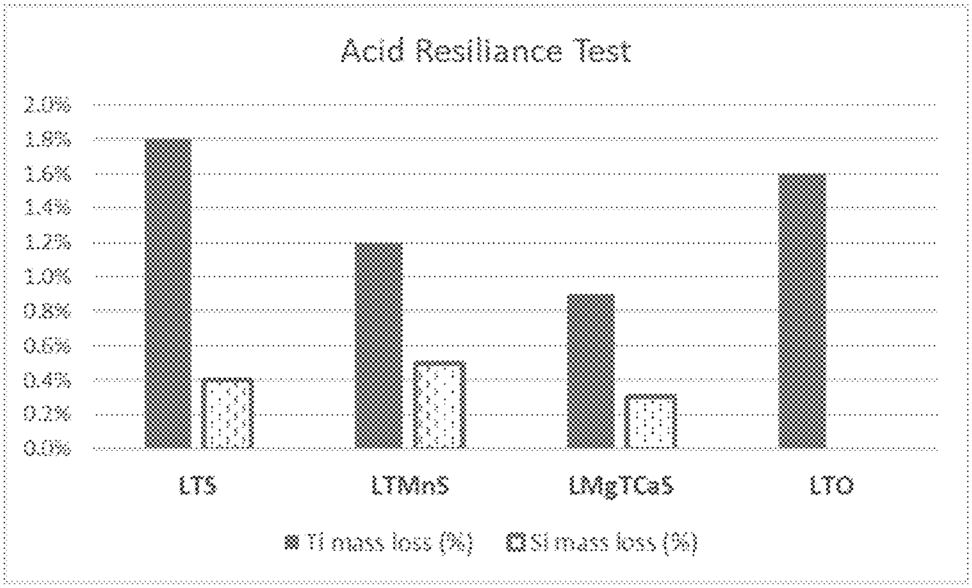
FIG. 2 is a graph showing dissolution of major constituents from orthosilicate and metal oxide sieves under extended acidic conditions.

To assess the acid resilience of the orthosilicate sieves, a sample of each orthosilicate sieve and LTO was placed in a 1M HCl solution heated at 60° C. and continuously agitated for one week. The degradation of the sieves under harsh acidic conditions was assessed by the measurement of dissolved primary constituents. Results are shown in FIG. 2. The titanium relative mass loss was between approximately 1 and 2 percent for all orthosilicate sieves and for the LTO sieve. This demonstrates the resilience of orthosilicate sieves under harsh acidic conditions. For orthosilicate sieves, any mass loss of silica was also monitored, and it remained under 0.5% for all samples. The LTMnS sieve showed a dissolution of manganese. Overall, the orthosilicate sieves LTS and LMgTCaS displayed ruggedness similar to the conventional LTO sieve. Acid resilience is important for commercial embodiments. Sieves need to be reusable for a number of cycles of lithium selection and then elution in order to reduce costs relating to material manufacturing, operations, refining, etc.

Example V: Comparison of Various Orthosilicate-Based Sieves

Several orthosilicate-based sieves were synthesized and tested for uptake lithium capacity, according to the methods set out above in Example II.

Iron-based lithium orthosilicates were synthesized as follows: $Li_2FeSiO_4$—Lithium Iron Silicate (LFS): 37 g of lithium carbonate (Sigma Aldrich), 69.5 g of $FeSO_4$ (Sigma Aldrich), and 15 g of fumed silica (Millipore Sigma) and $Li_2Fe_{0.9}Ti_{0.1}SiO_4$—Lithium Iron Titanate Silicate (LFTS): 37 g of lithium carbonate (Sigma Aldrich), 62.5 g of iron sulphate (Sigma Aldrich), 2 g of titanium dioxide (VWR), and 15 g of fumed silica (Millipore Sigma). The orthosilicates were de-lithiated and tested for lithium uptake according to the methods set out in Example II. Overall, in comparison with the titanium-based and the magnesium-based sieves, iron-based sieves performed poorly in terms of lithium uptake.

Manganese-based orthosilicates ($Li_2MnYZSiO_4$) were synthesized as follows: $Li_2MnSiO_4$—Lithium Manganese Silicate: 37 g of lithium carbonate (Sigma Aldrich), 21.5 g of manganese dioxide (Sigma Aldrich), and 15 g of fumed silica (Millipore Sigma); $Li_2Mn_{09}Ti_{01}SiO_4$—Lithium Manganese Titanate Silicate: 37 g of lithium carbonate (Sigma Aldrich), 19.35 g of manganese dioxide (Sigma Aldrich), 2 g of titanium dioxide (VWR), and 15 g of fumed silica (Millipore Sigma); and $Li_2Mn_{0.6}Fe_{0.4}SiO_4$—Lithium Manganese Iron Silicate: 37 g of lithium carbonate (Sigma Aldrich), 12.9 g of manganese dioxide (Sigma Aldrich), 27.8 g of iron sulphate (Sigma Aldrich), and 15 g of fumed silica (Millipore Sigma). Overall, in comparison with the titanium and the magnesium-based sieves, the de-lithiated manganese-based sieves performed poorly in terms of lithium uptake. It could be predicted based on Example IV, that single or doped manganese-based orthosilicates would suffer from material dissolution in acid. This would also be a limiting factor for manganese-based sieves.

Therefore, among several metal candidates, overall top-performing orthosilicate sieves were titanium-based and magnesium-based sieves. Nevertheless, other metal-based sieves can also be improved by either adding specific dopants, such as calcium, to restrict material dissolution or to tune crystal structure for selectivity.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims language, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

The invention claimed is:

1. A process for recovery of lithium ions from a lithium-bearing brine, the process comprising:

contacting the lithium-bearing brine with a lithium ion adsorbent that is a titanium-based orthosilicate or a magnesium-based orthosilicate.

2. The process of claim 1, wherein the lithium ion adsorbent is a de-lithiated compound selected from the group consisting of $Li_2MgSiO_4$, $Li_2Ti_xMn_ySiO_4$, $Li_2Mg_xTi_yCa_zSiO_4$ and combinations thereof, where x, y and z are each between 0 and 1 and x+y+z=1.

* * * * *